Figures 1, 2:
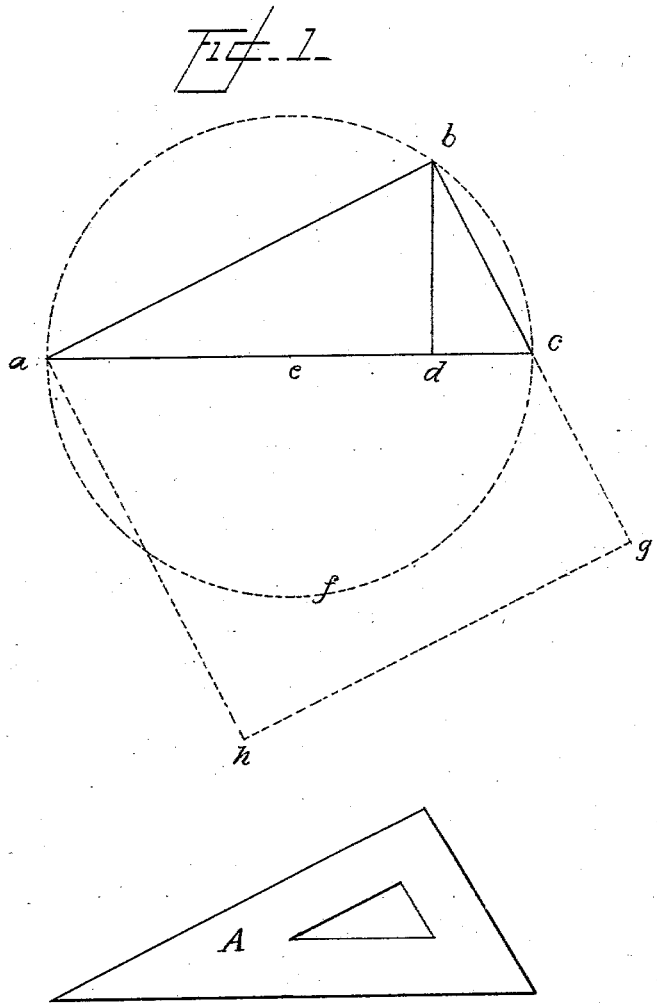

No. 753,458. PATENTED MAR. 1, 1904.
J. C. WILLMON.
INSTRUMENT FOR THE CONSTRUCTION OF EQUIVALENT
GEOMETRICAL FIGURES.
APPLICATION FILED JULY 1, 1903.
NO MODEL.

Witnesses
Geo. E. Winton
Margaret L. Nickelson

Inventor
Jeremy C. Willmon
By Hazard & Harpham
Attorneys

No. 753,458.

Patented March 1, 1904.

UNITED STATES PATENT OFFICE.

JEREMY C. WILLMON, OF LOS ANGELES, CALIFORNIA.

INSTRUMENT FOR THE CONSTRUCTION OF EQUIVALENT GEOMETRICAL FIGURES.

SPECIFICATION forming part of Letters Patent No. 753,458, dated March 1, 1904.

Application filed July 1, 1903. Serial No. 163,963. (No model.)

*To all whom it may concern:*

Be it known that I, JEREMY C. WILLMON, a citizen of the United States, residing at Los Angeles, in the county of Los Angeles and State of California, have invented new and useful Improvements in Instruments for the Construction of Equivalent Geometric Figures, of which the following is a specification.

My invention relates to an instrument by means of which a square may be constructed whose area shall equal that of any given circle; also, by means of which a circle may be constructed the area of which shall equal any given square; also, by means of which a straight line may be drawn equal to the circumference of any given circle; also, by means of which a circle may be drawn whose circumference shall equal any given straight line; and the object thereof is to provide an instrument which will accomplish the above purposes without arithmetical calculation. I accomplish this object by means of the instrument described herein and illustrated in the accompanying drawings, in which—

Figure 1 is a diagrammatic view of the formation of the essential angle of my instrument, with a circle and square shown in dotted lines. Fig. 2 is a side elevation showing a triangle embodying my invention.

In the drawings, A represents my complete triangle embodying my said invention and is formed in the following manner: Construct any circle—say the circle $a\,b\,c\,f$, having its center at $e$—then draw the line $a\,c$, forming the diameter of the circle. With $a$ as a starting-point measure off on the diameter a distance equal to one-fourth part of the circumference which will terminate at the point marked $d$. At the point $d$ erect a perpendicular to the line $a\,c$. This perpendicular line will intersect the circumference of the circle at $b$. Then draw the lines $a\,b$ and $b\,c$, thereby forming the right-angle triangle $a\,b\,c$, which forms a triangle embodying my invention in which the line $a\,b$ forms the greater cathetus and the line $b\,c$ forms the lesser cathetus and by means of which a square may be constructed equal in area to any given circle, or a circle may be constructed equal to any given square, or a straight line may be drawn equal to the circumference of any given circle, or a circle may be drawn the circumference of which shall equal the length of any given line.

To construct a square whose area shall equal that of any given circle, take any given circle and draw the diameter $a\,c$. Place my triangle with the apex angle $b\,a\,c$ at $a$ and with one side resting on the diameter $a\,c$. Mark on the circumference the point at which the side opposite that resting on the diameter and which helps to form the apex angle or the prolongation of such line intersects the circumference, and from this point draw a line to $a$, and this line will form one side of the required square.

To construct a circle whose area shall equal that of any given square, take any square, say $a\,b\,g\,h$, place the apex angle of my triangle at any corner of the square, with one of the sides which form said angle on the side of the square and the other side of the apex angle within or partly within the square, mark on the side of the square the point at which this last side or the prolongation thereof intersects the side of the square, and from this point draw a line to $a$, which forms the line $a\,c$ and is the diameter of the required circle.

To draw a straight line equal to the circumference of a circle, take the triangle and place it upon the diameter of the circle with the point $a$ resting on one end of the diameter and the base of hypotenuse $a\,c$ resting upon the diameter, then prolong the line $a\,b$ until it intersects the circumference of the circle. From this point draw a line to intersect the diameter and perpendicular thereto. The distance from the point at which this line intersects the diameter to the point $a$ will be one-fourth the circumference of the circle and the same can be produced to the required distance.

To construct a circle whose circumference shall equal any given straight line, you will divide the line into four equal parts and lay the triangle upon the line with the hypotenuse resting thereon, with the point $a$ at one of the ends thereof. Draw a perpendicular line from the point which is one-fourth of the distance from this end of this straight line. Draw a line along the greater cathetus to an intersection with this perpendicular line. This last line is bisected by a line at right angles thereto and the bisecting line extended to an intersection with the straight line. The point of intersection gives the center of the desired circle.

Having described my invention, what I claim as new, and desire to secure by Letters Patent, is—

A right-angle triangle having the hypotenuse equal to the diameter of a circle and the apex of the right angle in a line erected perpendicular to the hypotenuse from a point distant from one of the ends thereof the one-fourth part of the circumference of said circle.

In witness that I claim the foregoing I have hereunto subscribed my name this 25th day of June, 1903.

JEREMY C. WILLMON.

Witnesses:
G. E. HARPHAM,
HENRY T. HAZARD.